Patented July 3, 1934

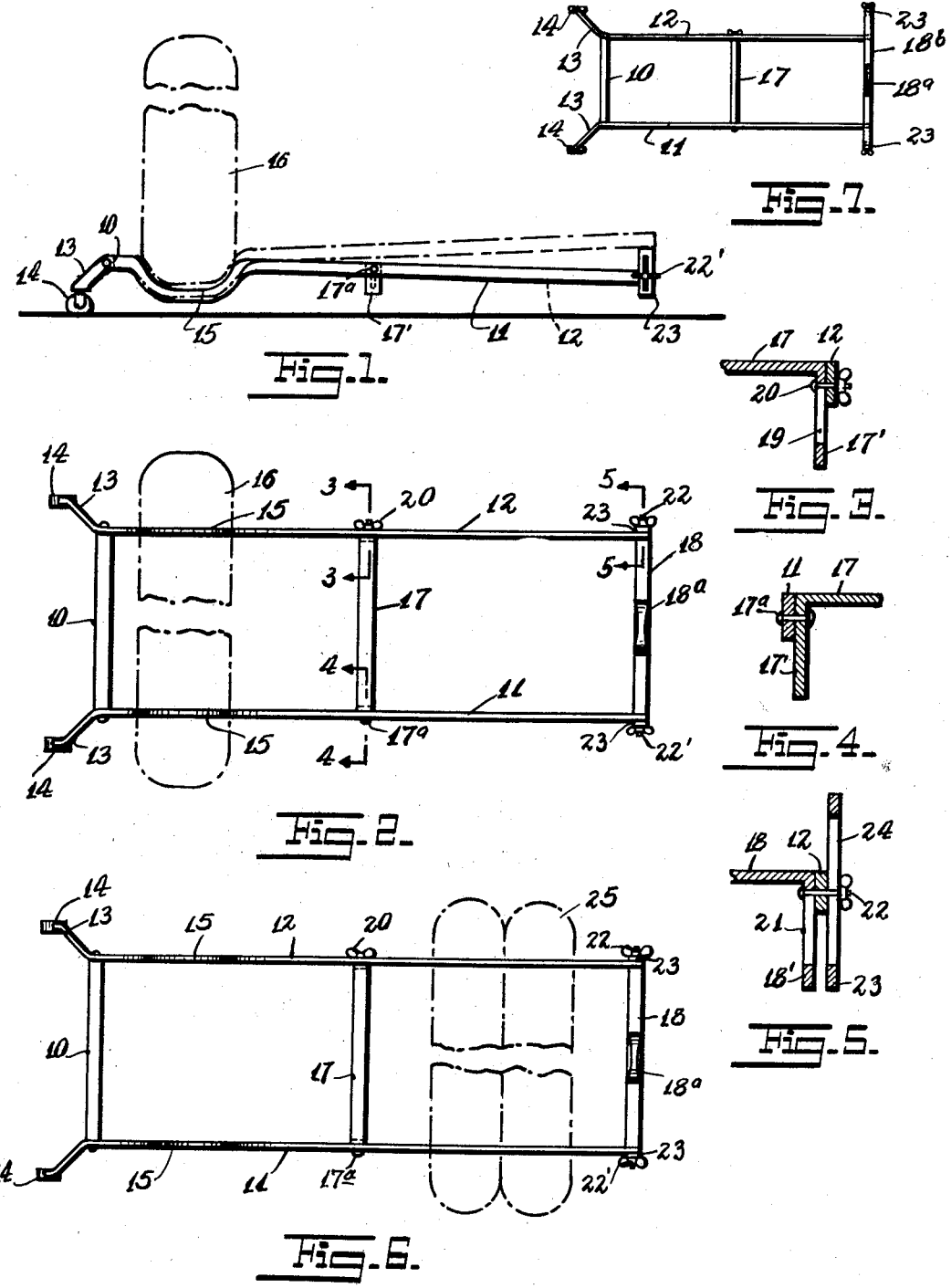

1,965,260

UNITED STATES PATENT OFFICE 1,965,260

AUTOMOBILE WHEEL LIFTER

Morris Rosenberg, Brooklyn, N. Y.

Application February 23, 1934, Serial No. 712,520

9 Claims. (Cl. 254—131)

This invention relates to new and useful improvements in an automobile wheel lifter.

The invention has for an object the construction of an article as mentioned which is characterized by a frame consisting of side bars depressed at portions for receiving a wheel in transverse position, and cross bars, and being adapted to have the front end rest upon the ground and the rear end lifted for lifting the wheel.

The device is particularly intended to lift and steady wheels of automobiles when placed in positions upon a vehicle. It is pointed out that great difficulty is experienced in replacing the wheels upon an automobile since they must be lifted to the correct position and held while certain bolts are engaged through parts thereof and tightened. Because of the exceptional weight of wheels it is exceedingly difficult to properly hold the wheels when replaced upon an automobile. A feature of the wheel lifter according to this invention is that the wheel may be lifted and held steady and adjusted until properly positioned.

Still further the invention proposes an arrangement whereby a rear double wheel of a truck may be guided upon the lifter, when removed and replaced upon the truck. In this manner the device will be a great aid.

Still further the invention particularly proposes an arrangement whereby the wheel lifter is arranged with a front cross bar, and with a pair of side bars pivoted upon the ends of the cross bar and having portions adjacent to the front of the cross bar extended downwards for resting upon the ground, and the side bars being provided with depressed portions for receiving a wheel in transverse position whereby each of the side bars may be raised or lowered selectively to twist the wheel slightly in addition to lifting the wheel when desired.

Still further the invention also proposes the provision of a rear cross bar fixedly attached at one end upon one of the side bars and at the other end having vertical extensions adjustably connected with the other of the side bars whereby the side bars may be rigidly connected to each other in desired positions.

Still further the invention also proposes the provision of several vertical bars adjustably mounted upon the rear ends of the side bars whereby the vertical bars may act as supports for supporting the rear of the wheel lifter to facilitate engaging and removing of the large rear wheels of a truck.

Still further the invention proposes the construction of an article as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of an automobile wheel lifter constructed according to this invention.

Fig. 2 is a plan view of Fig. 1.

Fig. 3 is a fragmentary sectional view taken on the line 3—3 of Fig. 2.

Fig. 4 is a fragmentary sectional view taken on the line 4—4 of Fig. 2.

Fig. 5 is a fragmentary sectional view taken on the line 5—5 of Fig. 2.

Fig. 6 is a plan view of Fig. 2 but illustrating a rear truck wheel engaged upon the wheel lifter.

The automobile wheel lifter according to this invention comprises a front cross bar 10 and a pair of side bars 11 and 12 pivoted upon the ends of the cross bar 10 and having portions 13 adjacent to the front of the cross bar 10 for extending downwards and resting upon the ground. Rollers or castors 14 are mounted upon the free ends of the portions 13 so that the wheel lifter may be easily rolled along the ground. Diametrically opposite portions of the side bars 11 and 12 are formed with depressed portions 15 for receiving a wheel in transverse position as indicated by the dot and dash lines 16. It will readily be understood that the wheel 16 will be firmly supported by the two side bars so that the rear ends of the side bars may be moved upwards or downwards around the rollers or castors 14 as pivots to raise and lower the wheel and hold the wheel when replaced or removed from the automobile.

Cross bars 17 and 18 are associated with the side bars 11 and 12. More particularly the cross bar 17 is arranged intermediate of the ends of the side bars and has downward extending ends 17' adapted to act as feet for resting the side bars against the ground if the shapes of the side bars are such as to permit this resting. A bolt 17ᵃ serves to permanently attach the side bar 11 upon the turndowned end 17' of the cross bar 17. The other turndowned end 17' of the cross bar is formed with a vertical slot 19 and a bolt 20 is adjustably mounted within the slot and engages the side bar 12 in a manner so that the side bar 12 may be fixed in various adjusted positions relative to the cross bar 17.

The cross bar 18 is similarly formed as the cross bar 17 but is located at the rear ends of the side bars. This cross bar 18 is formed with a bulged handle portion 18ª and downturned ends 18' adapted to act as feet for supporting the rear ends of the side bars. One of these downturned ends 18' is formed with a vertical slot 21 and the bolt 22 slidably engages in the slot and connects with the side bar 12 for the purpose of adjustably connecting the side bar relative to the cross bar. The other downturned end 18' is provided with a bolt 22 engaging the side bar 11 for fixedly connecting these parts. In addition vertical bars 23 formed with vertical openings 24 are arranged upon the ends of the side bars 11 and 12 and are held in position by bolts 22 and 22'. More particularly these bolts are engaged through the slots 24 and are adapted to clamp the bars 23 in vertically adjusted positions. The arrangement is such that the ends of the bars 11 and 12 may be rested upon the ground at different altitudes depending merely upon the adjustment of the vertical bars 23.

The operation of the device is as follows: A wheel may be rested between the bars 11 and 12 upon the curved portions 15 thereof as indicated by the dot and dash lines 16. The lifter may be then pushed along the ground upon the rollers 14 until the wheel 16 is in position to be lifted and placed upon the axle of an automobile. Then the nuts 20 and 22 must be loosened so that the bars 11 and 12 may be moved rotative to each other. Next both the bars 11 and 12 should be lifted at their rear ends to lift the wheel 16 to the proper height. Then the bar 12 may be lifted higher or allowed to drop slightly downwards so as to cause the wheel 16 to slightly turn so as to adjust the wheel slightly so that the wheel may engage the bolts therein as is customary when engaging the wheel upon an automobile.

The wheel lifter may also be used for aiding in the removing and replacing of the double heavy wheels of a truck. For this purpose the rear end of the lifter should be used. More particularly the vertical rods 23 should be adjusted to the proper heights by manipulating the screws 22 and 22'. Then the wheel lifter should be placed so that the bars 11 and 12 are disposed beneath the truck wheel. In Fig. 6 the truck wheel is indicated by the dot and dash line 25. The top edges of the bars 11 and 12 should be greased and then the wheels 25 may be easily slipped backwards and forwards along the upper edges of the bars 11 and 12 for removing or replacing the wheel 25. It is pointed out that it is much easier to slide the wheel 25 along the edges of the bars 11 and 12 than to lift the wheel.

In Fig. 7 the cross bar 18ᵇ is made to extend beyond the side bars 11 and 12 so as to better balance the lifter when it is used for lifting truck wheels.

For lifting heavy truck wheels, the device may be first turned upside-down and greased, then used as a greased run for sliding very heavy wheels in position.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An automobile wheel lifter, comprising a front cross bar, a pair of side bars pivoted on the ends of said cross bar and having portions adjacent to the front of said cross bar extended downwards, and a rear cross bar fixedly attached at one end upon one of said side bars and at the other end having a vertical extension adjustably connected with the other of said side bars.

2. An automobile wheel lifter, comprising a front cross bar, a pair of side bars pivoted on the ends of said cross bar and having portions adjacent to the front of said cross bar extended downwards, and a rear cross bar fixedly attached at one end upon one of said side bars and at the other end having a vertical extension adjustably connected with the other of said side bars, said side bars being provided with opposite curved portions for aiding in supporting a wheel transversely across the bars.

3. An automobile wheel lifter comprising a front cross bar, a pair of side bars pivoted on the ends of said cross bar and having portions adjacent to the front of said cross bar extended downwards, and a rear cross bar fixedly attached at one end upon one of said side bars and at the other end having a vertical extension adjustably connected with the other of said side bars, rollers being mounted upon said downward extended front ends of the side bars.

4. An automobile wheel lifter comprising a front cross bar, a pair of side bars pivoted on the ends of said cross bar and having portions adjacent to the front of said cross bar extended downwards, and a rear cross bar fixedly attached at one end upon one of said side bars and at the other end having a vertical extension adjustably connected with the other of said side bars, said vertical extension being formed with a slot, and a bolt engaging through said vertical side slot and one of the side bars for constituting the adjustable mounting of the side bar with the vertical extension.

5. An automobile wheel lifter, comprising a front cross bar, a pair of side bars pivoted on the ends of said cross bar and having portions adjacent to the front of said cross bar extended downwards, and a rear cross bar fixedly attached at one end upon one of said side bars and at the other end having a vertical extension adjustably connected with the other of said side bars, and vertical bars adjustably mounted upon the rear ends of said side bars.

6. An automobile wheel lifter, comprising a front cross bar, a pair of side bars pivoted on the ends of said cross bar and having portions adjacent to the front of said cross bar extended downwards, and a rear cross bar fixedly attached at one end upon one of said side bars and at the other end having a vertical extension adjustably connected with the other of said side bars, and vertical bars adjustably mounted upon the rear ends of said side bars, said vertical bars having vertical slots, and bolts engaging through said vertical slots and the side bars to provide for the adjustable mounting.

7. An automobile wheel lifter, comprising a frame including a front cross bar and side bars with depressed portions for receiving a wheel in the transverse position, and said side bars being pivotally mounted on the ends of said cross bar and having portions extending to the front of the cross bar and downwards for resting on the ground.

8. An automobile wheel lifter, comprising a frame including a front cross bar and side bars with depressed portions for receiving a wheel in the transverse position, and said side bars being pivotally mounted on the ends of said cross bar and having portions extending to the front of the cross bar and downwards for resting on the ground, said depressed portions being arranged slightly to the rear of the said cross bar.

9. An automobile wheel lifter, comprising a frame including a front cross bar and side bars with depressed portions for receiving a wheel in the transverse position, said side bars being pivotally mounted on the ends of said cross bar and having portions extending to the front of the cross bar and downwards for resting on the ground, and means for fixedly holding the rear ends of said side bars in adjusted positions.

MORRIS ROSENBERG.